(12) United States Patent
Darshan

(10) Patent No.: US 8,195,965 B2
(45) Date of Patent: Jun. 5, 2012

(54) COMPENSATION FOR HIGH POWERED MIDSPAN POWER SOURCING EQUIPMENT

(75) Inventor: Yair Darshan, Petach Tikva (IL)

(73) Assignee: Microsemi Corp. - Analog Mixed Signal Group Ltd., Hod Hasharon (IL)

( * ) Notice: Subject to any disclaimer, the term of this patent is extended or adjusted under 35 U.S.C. 154(b) by 387 days.

(21) Appl. No.: 12/611,141

(22) Filed: Nov. 3, 2009

(65) Prior Publication Data

US 2010/0115299 A1    May 6, 2010

Related U.S. Application Data

(60) Provisional application No. 61/111,016, filed on Nov. 4, 2008.

(51) Int. Cl.
*G06F 15/177* (2006.01)
*G06F 1/26* (2006.01)
*G06F 9/00* (2006.01)

(52) U.S. Cl. ............ 713/300; 713/1; 713/310; 713/320; 713/321; 713/322; 713/323; 713/324; 713/330; 713/340

(58) Field of Classification Search .............. 713/1, 300, 713/310, 320–324, 330, 340; 361/42
See application file for complete search history.

(56) References Cited

U.S. PATENT DOCUMENTS

| | | | |
|---|---|---|---|
| 4,467,314 A | 8/1984 | Weikel et al. | |
| 4,528,667 A | 7/1985 | Fruhauf | |
| 4,692,761 A | 9/1987 | Robinton | |
| 4,733,389 A | 3/1988 | Puvogel | |
| 4,799,211 A | 1/1989 | Felker et al. | |
| 4,815,106 A | 3/1989 | Propp et al. | |
| 4,885,563 A | 12/1989 | Johnson et al. | |
| 4,903,006 A | 2/1990 | Boomgaard | |
| 4,992,774 A | 2/1991 | McCullough | |
| 5,032,833 A | 7/1991 | Laporte | |

(Continued)

FOREIGN PATENT DOCUMENTS

WO    9623377    8/1996

OTHER PUBLICATIONS

Bearfield, J.M., "Control the Power Interface of USB's Voltage Bus", Electronic Design, U.S., Penton Publishing, Clev. Ohio, vol. 45, No. 15, Jul. 1997 p. 80-86.

(Continued)

*Primary Examiner* — Fahmida Rahman
(74) *Attorney, Agent, or Firm* — Simon Kahn

(57) ABSTRACT

A midspan unit arranged to supply power to a powered device over data communication cabling constituted of a signal conditioner exhibiting a transfer function with a gain of not less than −0.4 dB as compared with: $(K1*(s+R/L1+a)\hat{\ }m)/((s+R/L2+b)\hat{\ }n)$ over a predetermined frequency range associated with the data transmitted from the powered device. s represents $2*\pi*(\sqrt{-1})*f$, wherein f represents the predetermined frequency range associated with the data terminal equipment to be powered. R represents the signal source impedance in parallel with the load termination impedance. L1 represents the effective inductance of a data transformer winding of the data transmitter of the powered device, the effective inductance determined responsive to power received by the powered device from the power sourcing equipment; and L2 represents the effective inductance of the data transformer winding of the data transmitter of the powered device expected by a receiver of the switch or hub equipment.

18 Claims, 4 Drawing Sheets

U.S. PATENT DOCUMENTS

| | | | |
|---|---|---|---|
| 5,066,939 | A | 11/1991 | Mansfield |
| 5,093,828 | A | 3/1992 | Braun et al. |
| 5,148,144 | A | 9/1992 | Sutterlin et al. |
| 5,192,231 | A | 3/1993 | Dolin |
| 5,351,272 | A | 9/1994 | Abraham |
| 5,452,344 | A | 9/1995 | Larson |
| 5,491,463 | A | 2/1996 | Sargeant et al. |
| 5,652,893 | A | 7/1997 | Ben Meir et al. |
| 5,684,826 | A | 11/1997 | Ratner |
| 5,689,230 | A | 11/1997 | Merwin et al. |
| 5,799,196 | A | 8/1998 | Flannery |
| 5,828,293 | A | 10/1998 | Rickard |
| 5,835,005 | A | 11/1998 | Furukawa et al. |
| 5,859,596 | A | 1/1999 | McRae |
| 5,884,086 | A | 3/1999 | Amoni et al. |
| 5,991,885 | A | 11/1999 | Chang |
| 5,994,998 | A | 11/1999 | Fisher et al. |
| 6,033,101 | A | 3/2000 | Reddick et al. |
| 6,115,468 | A | 9/2000 | De Nicolo |
| 6,125,448 | A | 9/2000 | Schwan et al. |
| 6,140,911 | A | 10/2000 | Fisher et al. |
| 6,218,930 | B1 | 4/2001 | Katzenberg et al. |
| 6,243,818 | B1 | 6/2001 | Schwan et al. |
| 6,301,527 | B1 | 10/2001 | Butland et al. |
| 6,329,906 | B1 | 12/2001 | Fisher et al. |
| 6,348,874 | B1 | 2/2002 | Cole |
| 6,377,874 | B1 | 4/2002 | Ykema |
| 6,393,607 | B1 | 5/2002 | Hughes et al. |
| 6,473,608 | B1 | 10/2002 | Lehr et al. |
| 6,480,510 | B1 | 11/2002 | Binder |
| 6,496,105 | B2 | 12/2002 | Fisher et al. |
| 2006/0063509 | A1 | 3/2006 | Pincu et al. |
| 2008/0062590 | A1* | 3/2008 | Karam ........................... 361/42 |
| 2009/0055662 | A1* | 2/2009 | Diab ............................. 713/300 |
| 2009/0083550 | A1 | 3/2009 | Diab |

OTHER PUBLICATIONS

RAD Data Comm. Ltd., "Token Ring Design Guide", 1994, #TR-20-01/94, Chapters 1 through 4-21.

PowerDsine Product Catalogue 1999, pp. 56-79 and 95-105, Israel.

Universal Serial Bus Specification—Rev 1.0, Jan. 15, 1996; Sec 4.2.1 pp. 29-30.

Universal Serial Bus Specification—Rev 1.0, Jan. 15, 1996; Sec 7.2.1-7.2.1.5 pp. 131-135.

Universal Serial Bus Specification—Rev 1.0, Jan. 15, 1996; Sec 9.2.1-9.2.5.1 pp. 170-171.

Universal Serial Bus Specification—Rev 1.0, Jan. 15, 1996; Sec 9.6.2 pp. 184-185.

Lynn K "Universal Serial Bus (USB) Power Management"; Wescon/97 Conference Proceedings, Santa Clara, CA, USA, Nov. 4-6, 1997; New York, N.Y.; IEEE Nov. 4, 1997 pp. 434-441 XP010254418.

* cited by examiner

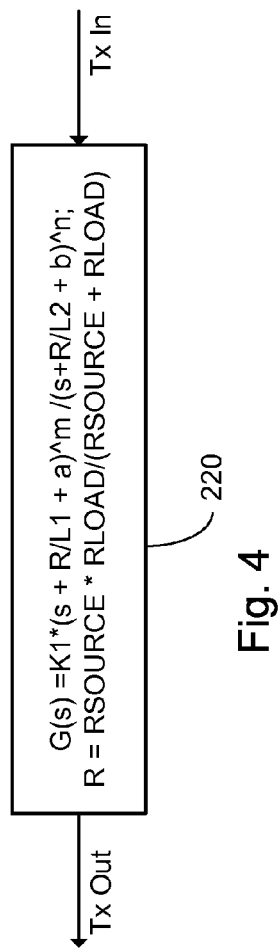
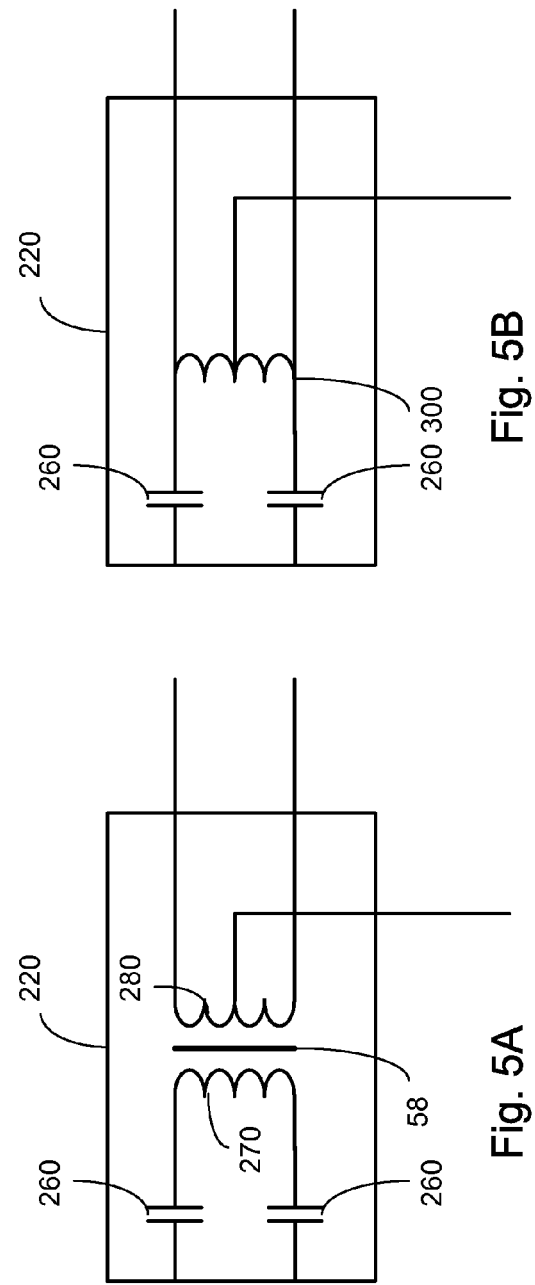
Fig. 4
$G(s) = K1*(s + R/L1 + a)^m / (s+R/L2 + b)^n;$
$R = RSOURCE * RLOAD/(RSOURCE + RLOAD)$
Fig. 5A
Fig. 5B

COMPENSATION FOR HIGH POWERED MIDSPAN POWER SOURCING EQUIPMENT

CROSS-REFERENCE TO RELATED APPLICATIONS

This application claims priority to U.S. Provisional Patent Application Ser. No. 61/111,016 filed Nov. 4, 2008, entitled "Compensation for High powered Midspan Power Sourcing Equipment", the entire contents of which are incorporated herein by reference.

TECHNICAL FIELD

The invention relates generally to the field of power over local area networks, particularly Ethernet based networks, and more particularly to a method of compensation of data signals transmitted from a powered device having a reduced effective inductance, passing through a Midspan power sourcing equipment.

BACKGROUND

The growth of local and wide area networks based on Ethernet technology has been an important driver for cabling offices and homes with structured cabling systems having multiple twisted wire pairs. The structure cable is also known herein as communication cabling and typically comprises four twisted wire pairs. In certain networks only two twisted wire pairs are used for communication, with the other set of two twisted wire pairs being known as spare pairs. In other networks all four twisted wire pairs are used for communication. The ubiquitous local area network, and the equipment which operates thereon, has led to a situation where there is often a need to attach a network operated device for which power is to be advantageously supplied by the network over the network wiring. Supplying power over the network wiring has many advantages including, but not limited to: reduced cost of installation; centralized power and power back-up; and centralized security and management.

The IEEE 802.3af-2003 standard, whose contents are incorporated herein by reference, is addressed to powering remote devices over an Ethernet based network. The above standard is limited to a powered device (PD) having a maximum power requirement during operation of 12.95 watts. Power can be delivered to the PD either directly from the switch/hub known as an endpoint power sourcing equipment (PSE) or alternatively via a Midspan PSE. In either case power is delivered over a set of two twisted pairs.

The IEEE 802.3at Task Force has been established to promote a standard for delivering power in excess of that described in the aforementioned IEE 802.3af-2003 standard. The IEEE 802.3at Task Force is in the processing of developing a high power standard, to be known as the IEEE 802.3at standard, which enables an increases power delivery over two twisted wire pairs, at least in part by substantially increasing the allowed current. When the increased current is passed through a data transformer, as is typically accomplished in phantom powering, the effective inductance of the data transformer is reduced, primarily as a result of a DC bias current flowing through the data transformer as a result of a current imbalance between each wire in a pair. Such a reduced inductance changes the data signal waveform, particularly by increasing the droop of the signal pulse.

IEEE 802.3-1995 published by the Institute of Electrical and Electronics Engineers, New York, the entire contents of which is incorporated herein by reference, specifies at clause 25.2, through incorporation, ANSI standard X3.263-1995, published by the American National Standards Institute, Washington, D.C., the entire contents of which is incorporated herein by reference. ANSI X3.263-1995 specifies a worst case droop for the driving data transformer of the physical layer level, which defines the minimum inductance of the driving data transformer to be 350 µH for 100 BaseT operation. As described above, as the phantom powering current increases, the imbalance current increases, the transformer DC bias current thus increases, and as a result the effective inductance is reduced, thereby increasing the droop beyond the specified lower limits, resulting in an increased bit error rate (BER).

One solution is to increase the inductance of the data transformer, so that at an increased phantom powering current the effective inductance meets the desired minimum. Unfortunately, increasing the inductance of the data transformer adds cost, and/or requires an increased physical size, and is thus not desirable.

Modern PHY receivers used in switches and PDs are capable of reading data transmitted from a transmitter exhibiting an inductance lower than 350 µH by utilizing digital signal processing techniques. In practice, switches and PD's exhibiting an effective inductance as low as 120 µH, and even lower, may be successfully operated using these techniques. Thus, as the current increases in accordance with the proposed IEEE 802.3at standard, the reduced inductance responsive to the increased DC bias current does not result in an increased BER, as long as the receiver is aware of the expected decreased effective inductance, and is provided with the appropriate digital signal processing techniques. The IEEE 802.3at Task Force has thus required mutual PSE-PD identification/classification which allows a lower inductance only if both the PSE and PD know that they are each of an IEEE 802.3at type, which must be supplied with an appropriate PHY. Older switches and PDs may not exhibit a PHY operative at low driving inductances, and thus they may be unable to reliably read such data, resulting in an increased BER when communicating with a DTE, either a switch or a PD, having such an effective low inductance.

FIG. 1 illustrates a high level block diagram of an arrangement 10 for powering a PD from a switch/hub equipment 30 using phantom powering in accordance with the above proposed IEEE 802.3at standard. Arrangement 10 comprises: switch/hub equipment 30 comprising a first and second data pair 20, a power sourcing equipment (PSE) 40, and a first and second data transformer 50; four twisted pair data connections 60 constituted in a single structured cable 65; and a powered end station 70 comprising a first and second data transformer 55, a first and second data pair 25, and a PD 80.

The primary of each of first and second data transformers 50 carry respective data pairs 20. An output and return of PSE 40 are connected, respectively, to the center tap of the secondary of first and second data transformers 50. The output leads of the secondary of first and second data transformers 50 are respectively connected to first ends of a first and a second twisted pair data connection 60 of structured cable 65. The second ends of first and second twisted pair data connections 60 are respectively connected to the primary of first and second data transformers 55 located within powered end station 70. The center tap of the primary of each of first and second transformers 55 is connected to a respective input of PD 80. Third and fourth twisted pair data connections 60 of structure cable 65 are connected to respective inputs of PD 80 for use in an alternative powering scheme known to those skilled in the art. In another embodiment, third and fourth twisted pair data connections 60 further carry data. First and second data pair 25 are connected (not shown) to PD 80, and represent data transmitted between PD 80 and switch/hub equipment 30.

In operation, PSE 40 supplies power over first and second twisted pair data connection 60, thus supplying both power and data over first and second twisted pair data connections 60 to PD 80. PSE 40 of switch/hub equipment 30 is in direct communication with PD 80 receiving the power. Thus, switch/hub equipment 30, implementing the above described mutual PD-PSE identification/classification, may identify that PD 80 is capable of using high power levels and is equipped with an appropriate PHY capable of handling transmitted signals generated with reduced inductance due to the increased current. PD 80 further identifies that PSE 40 of switch/hub equipment 30 is consonant with high power levels, and thus determines that switch/hub equipment 30 is therefore similarly equipped with an appropriate PHY capable of handling transmitted signals generated with reduced inductance due to the increased current. In the event that PD 80 does not identify PSE 40 as a high power PSE, PD 80 is required to consume low power levels, thereby not reducing the effective inductance of data transformers 50, 55.

FIG. 2 illustrates a high level block diagram of an arrangement 100 for powering a PD from a Midspan PSE in accordance with the above proposed IEEE 802.3at standard over data pairs, sometimes referred to as alternative A powering. Arrangement 100 comprises: a switch/hub equipment 35 comprising a first and second data pair 20 and a first and second data transformer 50; a first and a second set of four twisted pair data connections 60, each constituted in a single structured cable 65; a Midspan power insertion equipment 110 comprising a PSE 40 and a first and a second data transformer 57; and a powered end station 70 comprising a first and second data transformer 55, a first and second data pair 25, and a PD 80.

The primary of each of first and second data transformers 50 carry respective data pairs 20. The output leads of the secondary of first and second transformers 50 are connected, respectively, to the primary of first and second data transformer 57 via a respective first and second twisted data pair connection 60 of first structured cable 65. The center tap of the secondary of first and second data transformer 57 are respectively connected to the output and return of PSE 40. The output leads of the secondary of first and second data transformer 57 are connected, respectively, to the primary of first and second data transformer 55 via a respective first and second twisted data pair connection 60 of second structured cable 65. The center tap of the primary of each of first and second transformers 55 is connected to a respective input of PD 80. Third and fourth twisted pair data connections 60 of first structure cable 65 are connected through Midspan power insertion equipment 110 to third and fourth twisted pair data connection 60 of second structured cable 65, and third and fourth twisted pair data connections 60 of second structured cable 65 are further connected to respective inputs of PD 80 for use in an alternative powering scheme known to those skilled in the art. In another embodiment, third and fourth twisted pair data connections 60 further carry data. First and second data pair 25 are connected (not shown) to PD 80, and represent data transmitted between PD 80 and switch/hub equipment 35.

In operation PSE 40 of Midspan power insertion equipment 110 supplies power to powered end station 70 over first and second twisted pair data connections 60 of second structured cable 65, along with data being supplied from switch/hub equipment 35. Power from PSE 40 is of a sufficiently high current to reduce the effective inductance of the windings of data transformers 57 and 55 in which the current of PSE 40 flows. Data transformers 50 exhibit their initial inductance, typically at least 350 µH, due to the fact that there is no load current flowing through them. As a result, data transmitted from switch/hub equipment 35 to PD 80 does not exhibit an increased droop, and the data may thus be read by PD 80 without requiring the above mentioned digital signal processing techniques.

PD 80 performs mutual PSE-PD identification/classification with PSE 40 of Midspan power insertion equipment 110, and thus does not properly identify the capabilities of switch/hub equipment 35. In particular, switch/hub equipment 35 may be incapable of deciphering data transmitted by data pair 25 of powered end station 70 of PD 80, as it exhibits a droop associated with a data transformer of 120 µH due to the effect of the current from PSE 40 in place of the droop associated with a data transformer of 350 µH. Thus, the arrangement of FIG. 2 may result in an increased BER.

What is desired, and not supplied by the prior art, is a mechanism to allow for the use of a Midspan PSE supporting increased power rates above those permitted by IEEE 802.3af-2003, without substantially increasing the BER.

SUMMARY

Accordingly, it is a principal object of the present invention to overcome at least some of the disadvantages of the prior art. This is provided in certain embodiments by a signal conditioner inserted between the PD and the switch/hub equipment, preferably as part of the Midspan unit. The signal conditioner is arranged to at least partially compensate for the increased droop presented by the data transformer of the PD receiving a high power. Preferably, the signal conditioner is operative such that the switch receives data exhibiting a droop more closely resembling the droop of a minimum 350 µH data transformer.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding sections or elements throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 4 illustrates a block diagram of the desired transfer function of an embodiment of a signal conditioner; and FIGS. 5A and 5B illustrate schematic diagrams of an approximation of the desired transfer function of FIG. 4 implemented with passive components.

DETAILED DESCRIPTION OF PREFERRED EMBODIMENTS

Figure 1:
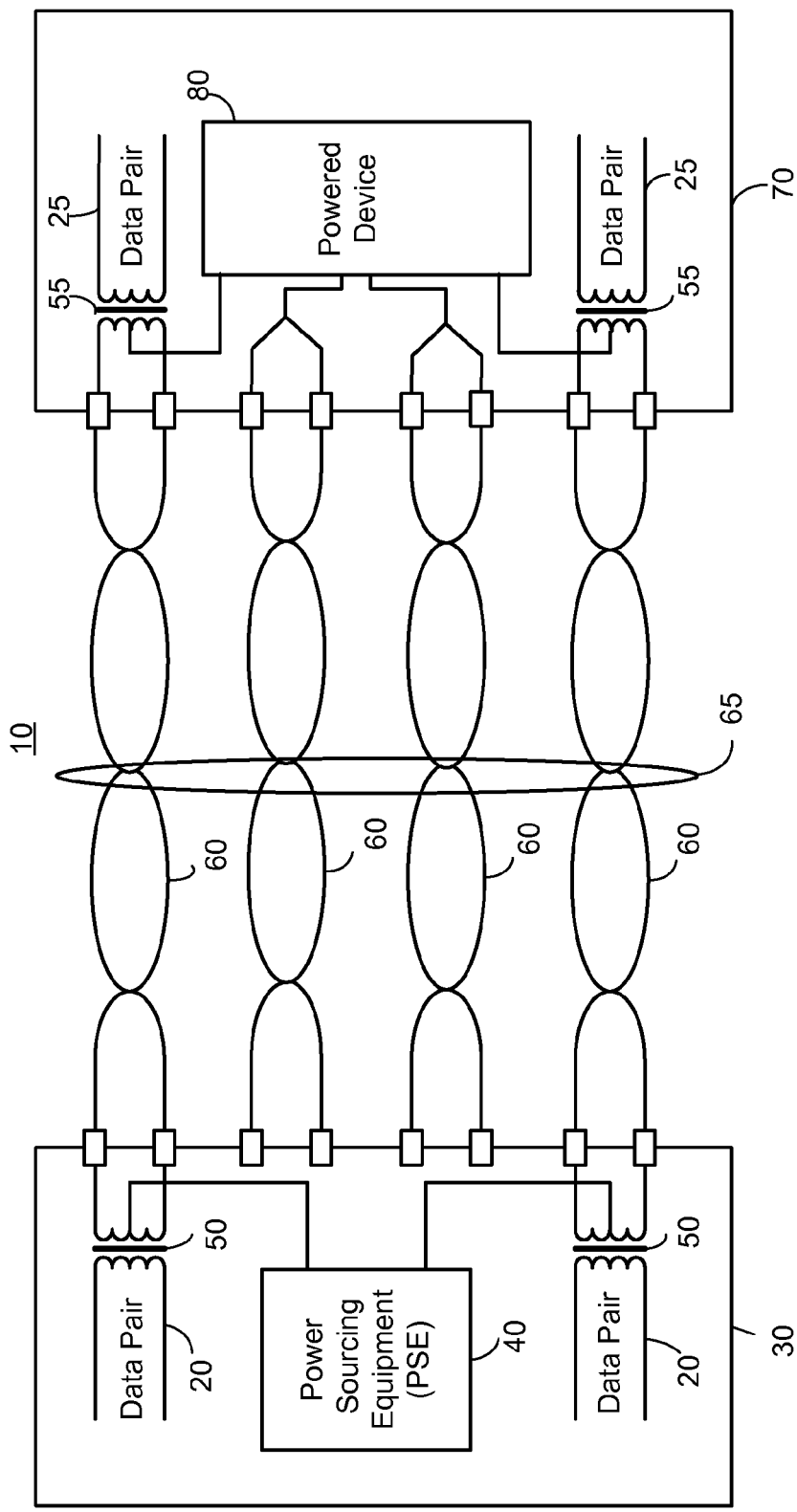
FIG. 1 illustrates a high level block diagram of an arrangement for powering a DTE from a switch/hub equipment using phantom powering in accordance with the prior art.
Figure 2:
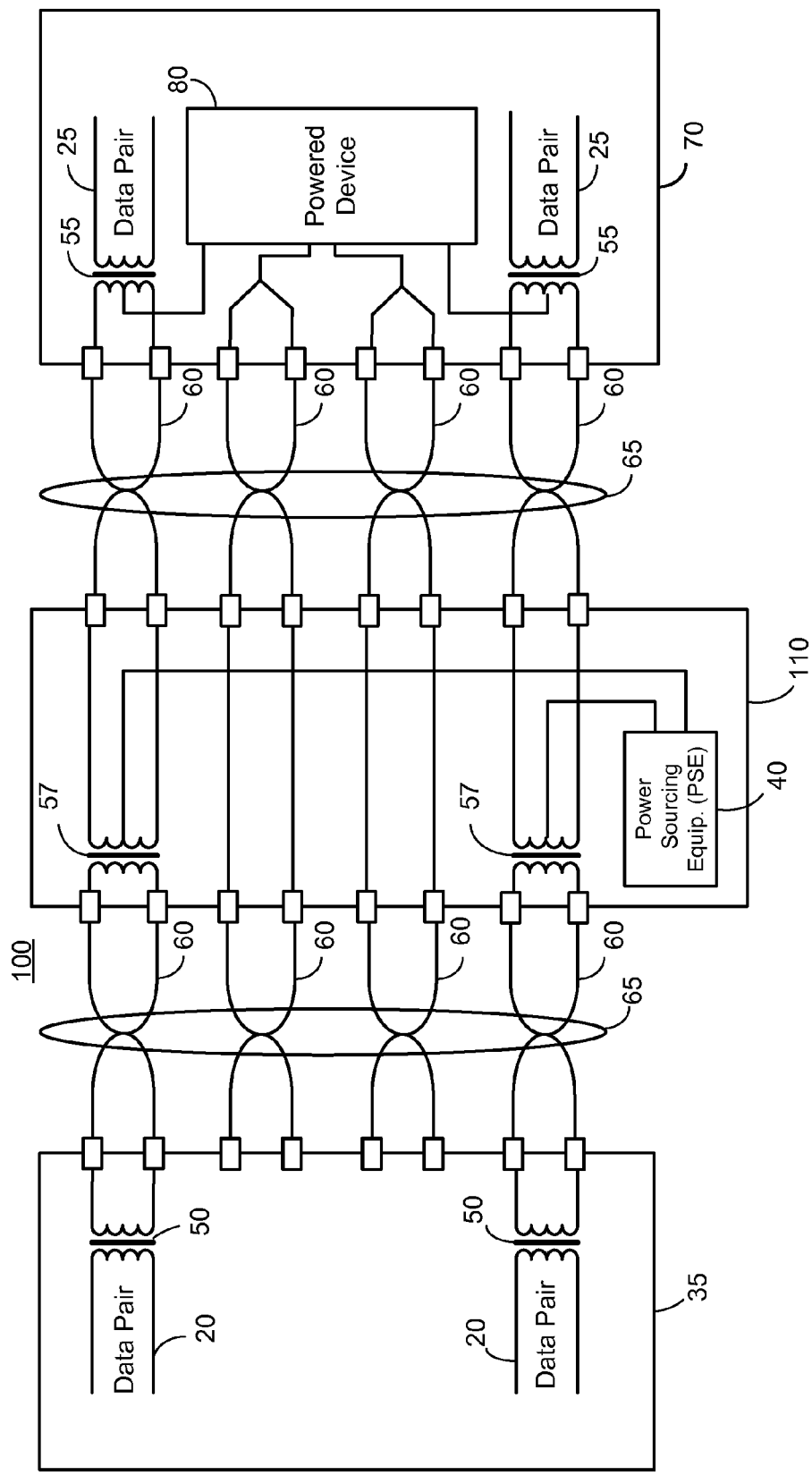
FIG. 2 illustrates a high level block diagram of an arrangement for powering a PD from a Midspan PSE over data pairs, sometimes referred to as alternative A powering, in accordance with the proposed standard.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 3:
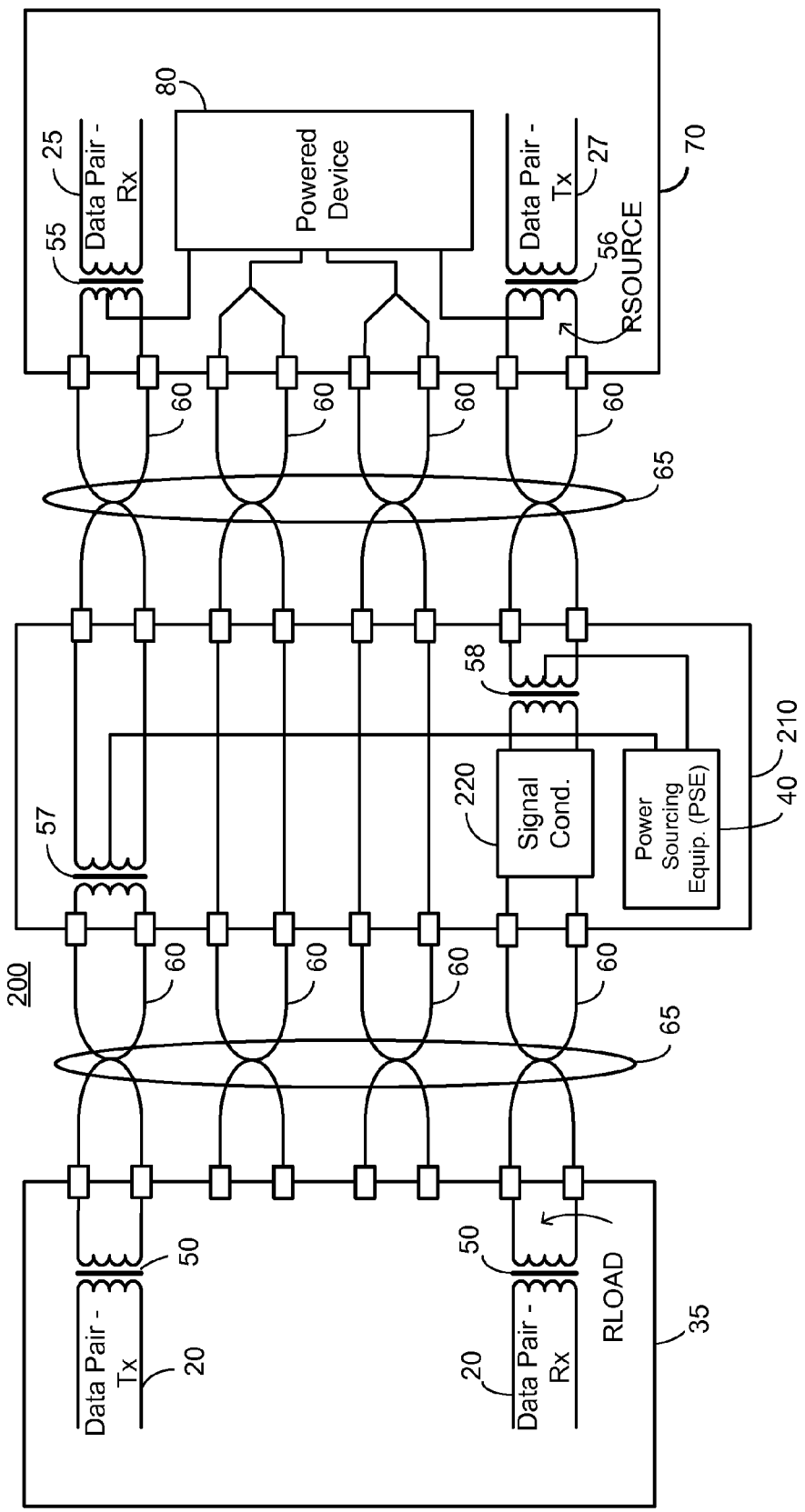
FIG. 3 illustrates a high level block diagram of an arrangement for powering a PD from a Midspan PSE over data pairs, sometimes referred to as alternative A powering, incorporating a signal conditioner.

The invention is being described as an Ethernet based network, with a powered device being connected thereto. It is to be understood that the powered device is preferably an IEEE 802.3 compliant device FIG. 3 illustrates a high level block diagram of an arrangement 200 for powering a PD from a Midspan PSE over data pairs, sometimes referred to as alternative A powering, incorporating a signal conditioner 220. Arrangement 200 comprises: a switch/hub equipment 35 comprising a first and second data pair 20 and a first and second data transformer 50; a first and a second set of four twisted pair data connections 60, each constituted in a single structured cable 65; a Midspan power insertion equipment 210 comprising a PSE 40, signal conditioner 220, a first data transformer 57 and a second data transformer 58; and a powered end station 70 comprising a receive data transformer 55 and a transmit data transformer 56, a receive data pair 25, a transmit data pair 27 and a PD 80. RSOURCE is the signal source impedance associated with transmit data pair 27 and RLOAD is the load termination impedance associated with second data pair 20. Signal conditioner 220 is illustrated as being separate from second data transformer 58, however this is not meant to be limiting in any way, and in certain embodiments second data transformer 58 forms part of signal conditioner 220. First data transformer 57 and second data transformer 58 are each illustrated as a two winding transformer, however this is not meant to be limiting in any way, and in another embodiment, as described further in relation to FIG. 5B, second data transformer 58 is replaced with an autotransformer without exceeding the scope. First data transformer 57 may be similarly replaced with an autotransformer without exceeding the scope.

The primary of each of first and second data transformers 50 carry receive respective data pairs 20. The output leads of the secondary of first transformer 50, representing transmit data from switch/hub equipment 35 associated with first data pair 20, are connected to the primary leads of first data transformer 57 via first twisted data pair connection 60 of first structured cable 65. The output leads of the secondary of second transformer 50, representing receive data from PD 80 for switch/hub equipment 35 associated with second data pair 20, are connected via second twisted data pair connection 60 of first structured cable 65 through signal conditioner 220 to the primary of second data transformer 58.

The center tap of the secondary of first data transformer 57 and second data transformer 58 are respectively connected to output and return of PSE 40. The output leads of the secondary of first data transformer 57 are connected, respectively, to the primary leads of first data transformer 55 via a first twisted data pair connection 60 of second structured cable 65. The output leads of the secondary of second data transformer 58 are connected, respectively, to the primary leads of second data transformer 56 via a second twisted data pair connection 60 of second structured cable 65.

The center tap of the primary of each of first and second data transformers 55, 56 are connected to a respective input of PD 80. Third and fourth twisted pair data connections 60 of first structure cable 65 are connected through Midspan power insertion equipment 210 to third and fourth twisted pair data connection 60 of second structured cable 65, and third and fourth twisted pair data connections 60 of second structured cable 65 are further connected to respective inputs of PD 80 for use in an alternative powering scheme known to those skilled in the art. In another embodiment, third and fourth twisted pair data connections 60 further carry data. First data pair 25 and second data pair 27 are connected (not shown) to PD 80, and represent data transmitted from switch/hub equipment 35 to PD 80 and data transmitted from PD 80 to switch/hub equipment 35, respectively.

The above has been illustrated with a single signal conditioner 220 placed within the receive data path from PD 80 to switch/hub equipment 35, however this is not meant to be limiting in any way. In another embodiment, for each data path a respective signal conditioner 220 is provided.

In operation, PSE 40 of Midspan power insertion equipment 210 supplies power to powered end station 70 over first and second twisted pair connections 60 of second structured cable 65, along with data being supplied from switch/hub equipment 35. Power from PSE 40 is of a sufficiently high current to reduce the effective inductance of the windings of data transformers 55, 56, 57 and 58 in which the current of PSE 40 flows. Thus, the data transmitted by PD 80 through data pair 27 exhibits a droop characteristic of a reduced effective inductance of the primary of second data transformer 56. Data transmitted by switch/hub equipment 35 exhibits a droop characteristic of a minimum 350 µH due to the fact that there is no PD load current flowing through data transformers 50.

Signal conditioner 220 is operative to condition the data signal output by data pair 27 to appear at second data pair 20 of switch/hub equipment 35, and more particularly at the secondary of second data transformer 50, with a droop characteristic of a low power operation, or of a data transformer not subject to DC powering. Switch/hub equipment 35 thus receives a data signal which meets its characteristics, resulting in an acceptable BER.

FIG. 4 illustrates a block diagram of the desired transfer function of an embodiment of signal conditioner 220 of FIG. 3. The transfer function preferably compensates for the increased droop of second data transformer 56 due to the increased current supplied by PSE 40. The transfer function of signal conditioner 220, preferably meets the equation:

$$G(s)=K1*(s+R/L1+a)\hat{}m/(s+R/L2+b)\hat{}n \qquad \text{EQ. 1}$$

where G(s) is the transfer function representing a Laplace transform of the compensation required to output a signal corresponding to a 350 µH droop when the source is a droop corresponding to a 120 µH inductance; s represents $j*2*\pi*f$, where "j" represents $\sqrt{-1}$ and "f" represents the frequency range of interest;

$$R \text{ is equal to: RSOURCE*RLOAD/(RSOURCE+RLOAD)} \qquad \text{EQ. 2;}$$

L1 represents the effective inductance seen by the transmitting transformer winding under the current provided by PSE 40; L2 represents the effective inductance of the transmitting transformer winding expected by the receiver; and K1, m and n are factors that compensate for component accuracy and for adjusting the approximation to the desired curve. K1 in particular sets the DC gain and R, as described in EQ. 2, represents the signal source impedance of the data transmitter of the data terminal equipment to be powered, RSOURCE, in parallel with the load termination impedance of the data receiver of the switch or hub equipment, RLOAD. In an exemplary embodiment, L1 is equal to 120 µH, and L2 is equal to 350 µH. A typical value for K1 is 0.995. For a low cost approximation, typical values for a,b,m and n are: m=n=1, a=b=0. In one embodiment, L1 represents the effective inductance of the transmitting transformer winding under the current provided by PSE 40 in parallel with the inductance of data transformer 58.

There is no requirement that signal conditioner 220 precisely meets EQ. 1, and an approximation thereof is acceptable. Preferably the approximation exhibits a gain of not less than −0.4 dB as compared to EQ. 1 over the desired frequency range. In an exemplary embodiment, the desired frequency range is 100 KHz to 1 MHz.

FIG. 5A illustrates a schematic diagram of an approximation of the desired transfer function of signal conditioner 220 of FIG. 4 implemented with passive components. Signal conditioner 220 comprises second data transformer 58 constituted of a primary winding 270 and a secondary winding 280, and a pair of capacitors 260 each inserted in one of the constituent wires of second twisted data pair connection 60 of first structured cable 65. Secondary winding 280 preferably exhibits an effective inductance under the current provided by PSE 40 of 350 µH to 900 µH over the entire operating current range. Preferably, capacitors 260 each exhibit a value of about 0.1 µF. Primary winding 270 preferably closely matches secondary winding 280.

FIG. 5B illustrates a schematic diagram of an approximation of the desired transfer function of signal conditioner 220 of FIG. 4 implemented with passive components, in which second data transformer 57 is replaced with an autotransformer 300. Signal conditioner 220 thus comprises autotransformer 300 and a pair of capacitors 260 each inserted in one of the constituent wires of second twisted data pair connection 60 of first structured cable 65. The winding of autotransformer 300 preferably exhibits an effective inductance under the current provided by PSE 40 of 350 µH to 900 µH over the entire operating current range. Preferably, capacitors 260 each exhibit a value of about 0.1 µF.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub combination. In particular, the invention has been described with an identification of each powered device by a class, however this is not meant to be limiting in any way. In an alternative embodiment, all powered device are treated equally, and thus the identification of class with its associated power requirements is not required.

Thus the present embodiment enable a signal conditioner inserted between the PD and the switch, preferably as part of the Midspan PSE unit. The signal conditioner is arranged to at least partially compensate for the increased droop presented by the data transformer of the PD receiving a high power. Preferably, the signal conditioner is operative such that the switch receives data exhibiting a droop more closely resembling the droop of a minimum 350 µH data transformer.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

I claim:

1. A midspan unit arranged to supply power for a powered device over data communication cabling, the midspan unit comprising:

a power sourcing equipment;

a signal conditioner;

a data terminal connection arranged for connection towards a powered device, the powered device arranged to receive power over data communication cabling from said power sourcing equipment, a pair of leads of said data terminal connection representing data transmitted from the powered device by a data transmitter of the powered device and further carrying at least a portion of said power, said data transmitter of the powered device having a data transformer exhibiting an effective inductance; and a network connection arranged for connection towards a switch or hub equipment, a pair of leads of said network connection representing conditioned data transmitted to the switch or hub equipment, said switch or hub equipment exhibiting a data receiver having a load termination impedance, said signal conditioner coupled to said pair of leads of said data terminal connection and to said pair of leads of said network connection, said signal conditioner arranged to receive said data transmitted from the powered device and output said conditioned data, said signal conditioner exhibiting a transfer function with a gain of not less than −0.4 dB as compared with:

$$(K1*(s+R/L1+a\hat{\ }m)/((s+R/L2+b)\hat{\ }n)$$

over a predetermined frequency range associated with the data transmitted from the powered device, wherein:

K1, m and n are factors that compensate for component accuracy and for adjusting the approximation to desired curve, and a and b are variables;

s represents $2*\pi*(\sqrt{-1})*f$, wherein f represents the predetermined frequency range associated with the data transmitted from the powered device;

R represents a signal source impedance of the data transformer of the data transmitter of the powered device in parallel with the load termination impedance of the data receiver of the switch or hub equipment;

L1 represents the effective inductance of the data transformer winding of the data transmitter of the powered device, said effective inductance determined responsive to power received by the powered device over the data communication cabling; and L2 represents the effective inductance of the data transformer winding of the data transmitter of the powered device expected by the data receiver of the switch or hub equipment.

2. The midspan unit of claim 1, wherein said signal conditioner comprises a first capacitor, a second capacitor and an inductor, said first capacitor coupled between a first lead of said pair of leads of said network connection and a first lead of said inductor, said second capacitor coupled between a second lead of said pair of leads of said network connection and a second lead of said inductor, said power sourcing equipment connected to a center tap of said inductor.

3. The midspan unit of claim 2, wherein each of said first capacitor and said second capacitor exhibit a value of about 0.1 and said inductor exhibits an effective inductance of the range of current supplied by said power sourcing equipment of 350 μH to 900 μH.

4. The midspan unit of claim 1, wherein said signal conditioner comprises a first capacitor, a second capacitor and a transformer exhibiting a first winding and a second winding, said first winding magnetically coupled to said second winding, said first capacitor coupled between a first lead of said pair of leads of said network connection and a first lead of said first winding, said second capacitor coupled between a second lead of said pair of leads of said network connection and a second lead of said first winding, said power sourcing equipment connected to a center tap of said second winding.

5. The midspan unit of claim 4, wherein each of said first capacitor and said second capacitor exhibit a value of about 0.1 μF and said second winding exhibits an effective inductance of the range of current supplied by said power sourcing equipment of 350 μH to 900 μH.

6. The midspan unit of claim 1, wherein L1 is about 120 μH and L2 is about 350 μH.

7. The midspan unit of claim 1, wherein K1 is about 0.995.

8. The midspan unit of claim 1, wherein m is equal to 1 and n is equal to 1.

9. The midspan unit of claim 1, wherein a is equal to 0 and b is equal to 0.

10. The midspan unit of claim 1, wherein the predetermined frequency range is 100 KHz to 1 MHz.

11. A method of providing midspan power to a powered device while allowing for data communication between a data transmitter of the powered device and a data receiver of a switch or hub equipment without excessive droop, the method comprising:

receiving data transmitted from the powered device data transmitter;

providing a signal conditioner; and conditioning said received data by said conditioner to output conditioned data towards the data receiver of the switch or hub equipment, said signal conditioner exhibiting a transfer function with a gain of not less than −0.4 dB as compared with:

$$(K1*(s+R/L1+a)^m)/((s+R/L2+b)^n)$$

over a predetermined frequency range associated with the data transmitted from the powered device, wherein:

K1, m and n are factors that compensate for component accuracy and for adjusting the approximation to desired curve, and a and b are variables;

s represents $2*\pi*(\sqrt{-1})*f$, wherein f represents the predetermined frequency range associated with the data transmitted from the powered device;

R represents a signal source impedance of the data transmitter of the powered device in parallel with a load termination impedance of the data receiver of the switch or hub equipment, the data receiver of the switch or hub equipment arranged to receive said output conditioned data;

L1 represents an effective inductance of a data transformer winding of the powered device data transmitter, said effective inductance determined responsive to midspan power provided to the powered device; and L2 represents an effective inductance of the data transformer winding of the powered device data transmitter expected by the data receiver of the switch or hub equipment.

12. The method of claim 11, wherein said signal conditioner comprises a first capacitor, a second capacitor and an inductor, said first capacitor coupled between a first lead of a network connection and a first lead of said inductor, said second capacitor coupled between a second lead of said network connection and a second lead of said inductor, the method further comprising connecting power to a center tap of said inductor.

13. The method of claim 12, wherein each of said first capacitor and said second capacitor exhibit a value of about 0.1 μF and said inductor exhibits an effective inductance of the range of current supplied by said power connected to said center tap of 350 μH to 900 μH.

14. The method of claim 11, wherein said signal conditioner comprises a first capacitor, a second capacitor and a transformer exhibiting a first winding and a second winding, said first winding magnetically coupled to said second winding, said first capacitor coupled between a first lead of a network connection and a first lead of said first winding, said second capacitor coupled between a second lead of the network connection and a second lead of said first winding, the method further comprising connecting power to a center tap of said second winding.

15. The method of claim 14, wherein each of said first capacitor and said second capacitor exhibit a value of about 0.1 μF and said second winding exhibits an effective inductance of the range of current supplied by said power connected to said center tap of 350 μH to 900 μH.

16. The method of claim 11, wherein L1 is about 120 μH and L2 is about 350 μH.

17. The method of claim 11, wherein m is equal to 1, n is equal to 1, a is equal to 0 and b is equal to 0.

18. The method of claim 11, wherein predetermined frequency is 100 KHz to 1 MHz.

* * * * *